(No Model.)
S. H. GILSON.
COMPOSITION FOR OVERHEAD INSULATORS.
No. 415,864. Patented Nov. 26, 1889.
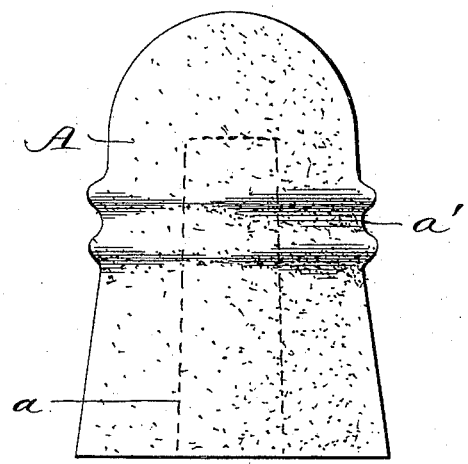
Witnesses:
Edward K. Sturtevant.
Daniel Curry.
Inventor:
S. H. Gilson
by J. H. Houghton,
attorney.

UNITED STATES PATENT OFFICE.

SAMUEL H. GILSON, OF SALT LAKE CITY, UTAH TERRITORY.

COMPOSITION FOR OVERHEAD INSULATORS.

SPECIFICATION forming part of Letters Patent No. 415,864, dated November 26, 1889.

Application filed September 28, 1888. Serial No. 286,701. (No specimens.)

*To all whom it may concern:*

Be it known that I, SAMUEL H. GILSON, a citizen of the United States, residing at Salt Lake City, in the county of Salt Lake and Territory of Utah, have invented certain new and useful Improvements in Compositions for Overhead Insulators; and I do declare the following to be a full, clear, and exact description of the invention, such as will enable others skilled in the art to which it appertains to make and use the same, reference being had to the accompanying drawing, and to the letters and figures of reference marked thereon, which form a part of this specification.

In Patents No. 361,759, granted to me April 26, 1887, and No. 362,076, granted to me May 3, 1887, I described the substance called "gilsonite," and also certain compositions including such substance as an element, which were adapted for certain uses, as set forth in said patents.

My present invention relates to a composition different from those above referred to, having other characteristics, and adapted for use under other conditions, especially of temperature.

By this invention a composition is produced adapted to be molded into overhead insulators, which, besides being very economical of production, are most efficient in giving perfect insulation, in retaining their plasticity under low temperatures, and which are very durable.

In order to illustrate the application of my composition, I have shown in the accompanying drawing an overhead insulator molded from the same.

In carrying my invention into effect I take, by weight, twenty parts of gilsonite and seventy-four parts of dry sand, coal-dust, broken glass, or clay, and mix them together. I then add to the compound six per cent. of petroleum-still wax. The mixture is subjected in a suitable vessel to the action of heat until it is reduced to liquid form, and is then beaten and stirred until all the elements are thoroughly commingled and the composition is homogeneous. It is then molded into the form of the insulator in any suitable manner.

In the drawing, A indicates the insulator, provided with an internal screw-threaded recess $a$, and provided upon its exterior with a groove $a'$, by which the line-wire is secured in place.

The above insulator will be found when cool to still possess sufficient elasticity to enable it to stand the intense cold of the higher latitudes and elevations above the sea without danger of fracture.

The granulated material above mentioned (sand, &c.) is a fair insulator in itself, but when its particles are separated by the gilsonite, which latter may be termed the "most perfect insulator," an article is produced of the highest value for maintaining in an electric wire the full strength of the current.

Having thus described my invention, what I claim is—

1. The herein-described composition for overhead insulators, consisting of gilsonite, a granulated material, and petroleum-still wax, in substantially the proportion of twenty parts of the gilsonite, seventy-four parts of the granulated material, and six parts of the wax, as set forth.

2. The herein-described composition for overhead insulators, consisting of gilsonite, sand, and petroleum-still wax, in substantially the proportions of twenty parts of the gilsonite, seventy-four parts of the sand, and six parts of the wax, as set forth.

In testimony whereof I affix my signature in presence of two witnesses.

SAMUEL H. GILSON.

Witnesses:
FERGUS FERGUSON,
L. B. S. MILLER.